United States Patent
Peng et al.

(10) Patent No.: US 10,805,584 B2
(45) Date of Patent: Oct. 13, 2020

(54) PROJECTION SYSTEM AND IMAGE PROJECTION METHOD

(71) Applicant: Coretronic Corporation, Hsin-Chu (TW)

(72) Inventors: Chien-Chun Peng, Hsin-Chu (TW);
Chi-Wei Lin, Hsin-Chu (TW);
Yung-Chiao Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/184,951

(22) Filed: Nov. 8, 2018

(65) Prior Publication Data

US 2019/0149786 A1    May 16, 2019

(30) Foreign Application Priority Data

Nov. 15, 2017    (CN) .......................... 2017 1 1129245

(51) Int. Cl.
*H04N 9/31* (2006.01)
*G06T 7/73* (2017.01)

(52) U.S. Cl.
CPC ............. *H04N 9/3185* (2013.01); *G06T 7/74* (2017.01); *H04N 9/3188* (2013.01); *H04N 9/3194* (2013.01); *G06T 2207/30208* (2013.01)

(58) Field of Classification Search
CPC .. H04N 9/3185; H04N 9/3188; H04N 9/3194; G06T 7/74; G06T 2207/30208
See application file for complete search history.

(56) References Cited

U.S. PATENT DOCUMENTS

2005/0168705 A1    8/2005  Li et al.
2011/0285726 A1*   11/2011 Redmann ............ H04N 9/3102
                                                    345/467
(Continued)

FOREIGN PATENT DOCUMENTS

CN      1489382      4/2004
CN      1701603      11/2005
(Continued)

OTHER PUBLICATIONS

"Office Action of China Counterpart Application", dated Aug. 10, 2020, p. 1-p. 10.

*Primary Examiner* — Oschta I Montoya
(74) *Attorney, Agent, or Firm* — JCIPRNET

(57) ABSTRACT

A projection system including a projection device, an image capturing device and a processing device is provided. The projection device projects a plurality of grid patterns to a projection target. The projection target includes a border region and a projection region. The border region surrounds the projection region. The grid patterns are deformed at the border region. The image capturing device captures a capturing image including an image of the projection target. The image of the projection target includes a deformation region. The processing device receives the capturing image including the image of the projection target, and determines a position of the border region according to the deformation region of the image of the projection target, and controls the projection device to project a projection image to the projection region of the projection target according to the position of the border region.

16 Claims, 9 Drawing Sheets

(56) References Cited

U.S. PATENT DOCUMENTS

2015/0371394 A1\* 12/2015 Visentini .............. H04N 13/161
  382/154
2016/0021350 A1 1/2016 Schultz et al.
2017/0262967 A1\* 9/2017 Russell .................. G06T 5/006

FOREIGN PATENT DOCUMENTS

| CN | 103748515 | 4/2014 |
| CN | 104634277 | 5/2015 |
| CN | 106162124 | 11/2016 |
| CN | 106657848 | 5/2017 |
| CN | 108519717 | 9/2018 |

\* cited by examiner

PROJECTION SYSTEM AND IMAGE PROJECTION METHOD

CROSS-REFERENCE TO RELATED APPLICATION

This application claims the priority benefit of China application serial no. 201711129245.4, filed on Nov. 15, 2017. The entirety of the above-mentioned patent application is hereby incorporated by reference herein and made a part of this specification.

BACKGROUND OF THE INVENTION

Field of the Invention

The invention relates to a projection system and an image projection method, and particularly relates to a projection system capable of adjusting a projection image according to an image captured by an image capturing device and an image projection method thereof.

Description of Related Art

Projection device is a device capable of projecting images to a projection screen for presenting to users. An image correction function of a known projection device is generally too complicated in operation, and the user has to make multiple adjustments to a projected image in order to match a projection image with a projection region of projection screen, and manual adjustment of the user is always hard to achieve a precise projection position. Therefore, how to quickly and automatically adjust the image projected by the projection device to the projection region of the projection screen is a focus concerted by related technicians of the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a projection system, which is adapted to quickly and automatically adjust an image projected by a projection device to a projection area complied with a projection target.

The invention is directed to an image projection method, which is adapted to quickly and automatically adjust a projected image to a projection area complied with a projection target.

Other objects and advantages of the invention can be further illustrated by the technical features broadly embodied and described as follows.

In order to achieve one or a portion of or all of the objects or other objects, an embodiment of the invention provides a projection system including a projection device, an image capturing device and a processing device. The projection device is configured to project a plurality of grid patterns to a projection target. The projection target includes a border region and a projection region. The border region surrounds the projection region. The grid patterns are deformed at the border region. The image capturing device is configured to capture a capturing image including an image of the projection target. The image of the projection target includes a deformation region. The processing device is configured to receive the capturing image including the image of the projection target, and determine a position of the border region according to the deformation region of the image of the projection target, and control the projection device to project a projection image to the projection region of the projection target according to the position of the border region.

In order to achieve one or a portion of or all of the objects or other objects, an embodiment of the invention provides an image projection method, which includes following steps: projecting a plurality of grid patterns to a projection target; capturing a capturing image including an image of the projection target; and determining a position of a border region according to a deformation region of the image of the projection target, and projecting a projection image to a projection region of the projection target according to the position of the border region. The projection target includes the border region and the projection region, and the border region surrounds the projection region. The grid patterns are deformed at the border region. The image of the projection target includes the deformation region.

According to the above description, the projection system and the image projection method of the invention use the image capturing device to capture the image including the projection target, and quickly and automatically adjust the projection image to the projection region of the projection target according to the image of the projection target.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
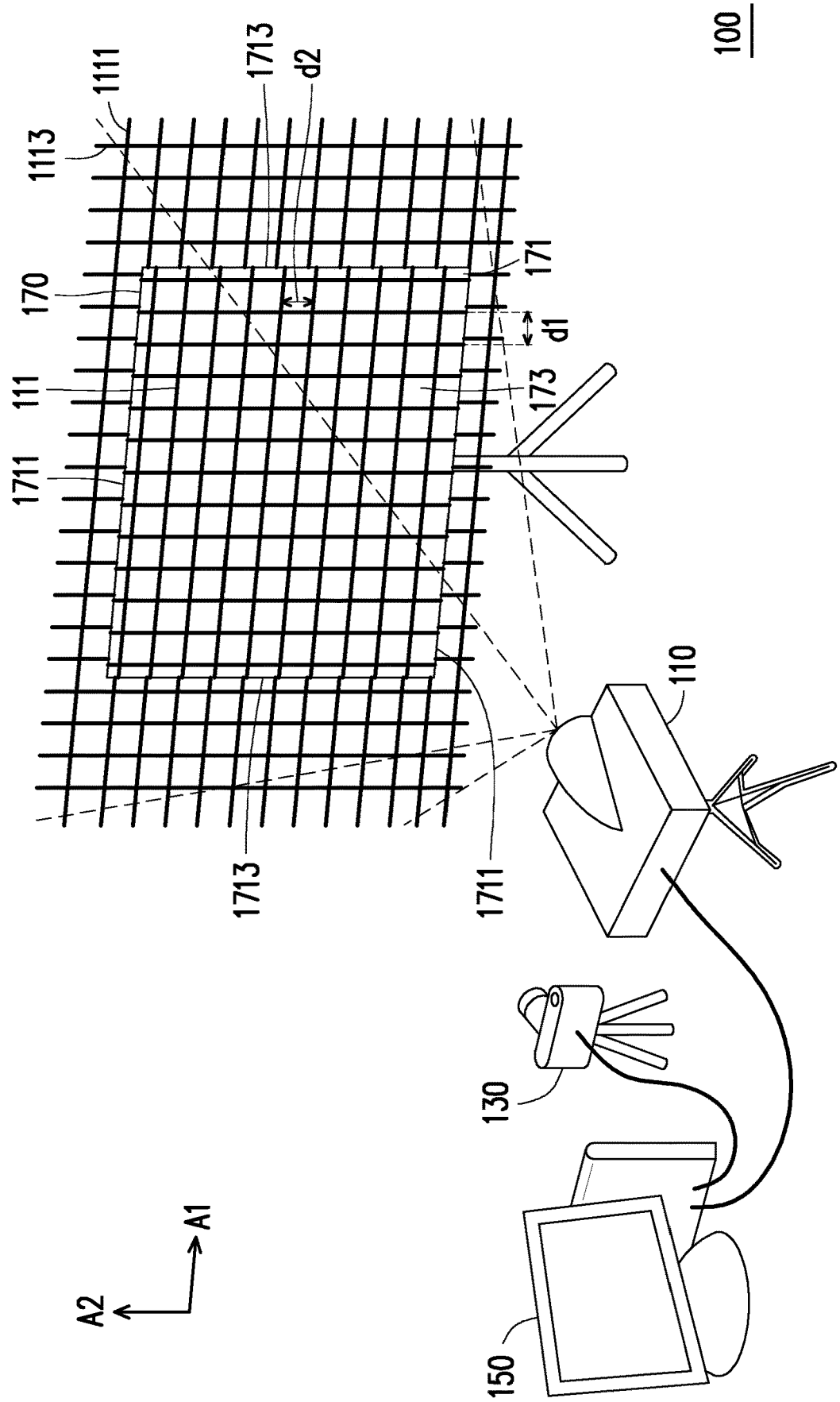
FIG. 1A is a schematic diagram of a projection system according to an embodiment of the invention.

FIG. 1A is a schematic diagram of a projection system according to an embodiment of the invention. The projection system 100 of the present embodiment includes an image capturing device 130, a processing device 150 and a projection device 110. The projection device 110 is adapted to project a grid pattern 111 to a projection target 170. The grid pattern 111 may be stored in a storage device (for example, a memory) of the processing device 150 or the projection device 110, and by turning on the projection device 110, the grid pattern 111 may be directly projected. The grid pattern 111 may be deformed (for example, discontinuous line segments) at a border region 171 of the projection target 170. The image capturing device 130 may capture an image including the projection target 170, where a size range of the image captured by the image capturing device 130 is greater than a size range of the projection target 170. The image of the projection target 170 includes deformation of the grid pattern 111 produced at the border region 171. The processing device 150 may determine a position of the border region 171 according to the deformation of the grid pattern 111 in the image captured by the image capturing device 130 at the border region 171, to be specific, a relative position capable of distinguishing the projection target 170 and a background (for example, a wall). Moreover, the processing device 150 controls the projection device 110 to project a projection image to a projection region 173 of the projection target 170 according to the position of the border region 171, so as to quickly and automatically adjust a size of the projection image to a size of the projection region 17.

Figure 2A:
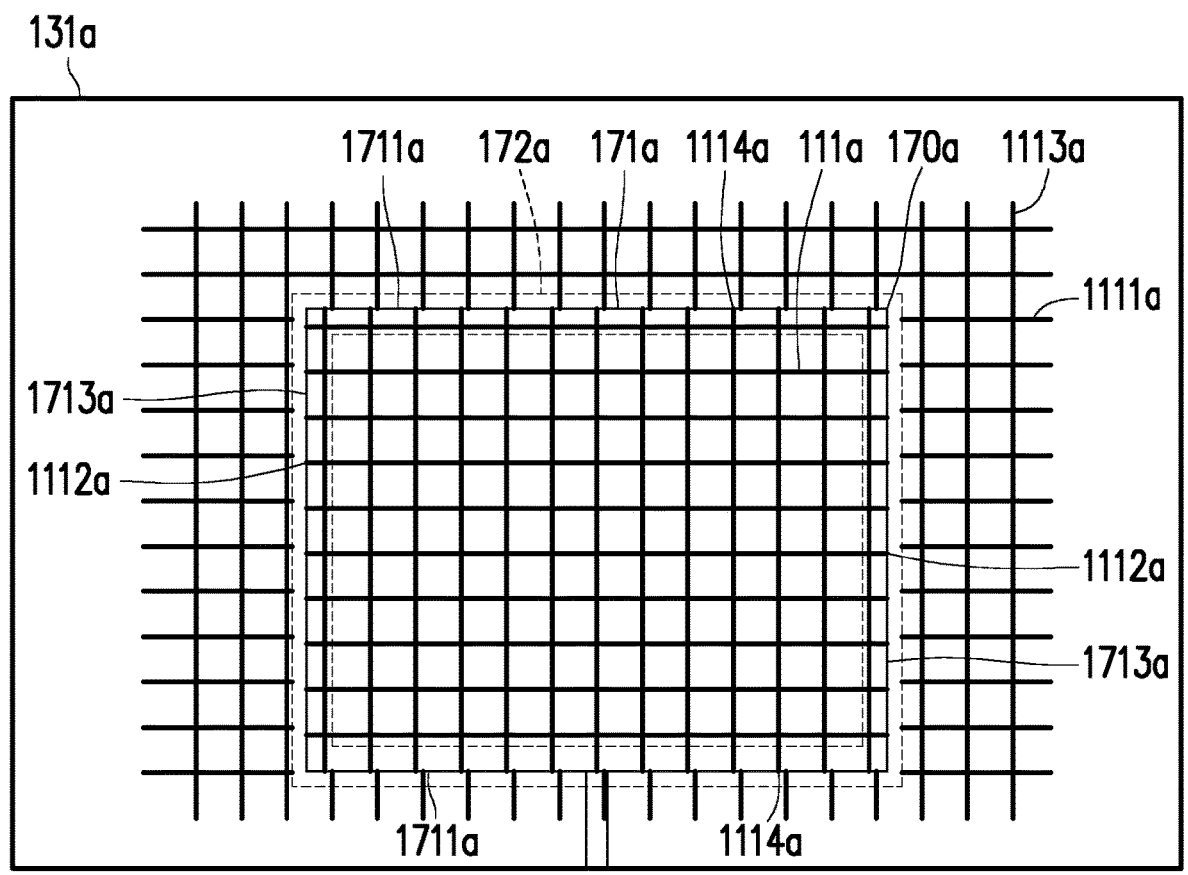
FIG. 2A is a schematic diagram of a capturing image captured by an image capturing device of the embodiment of FIG. 1A.
Figure 2A:
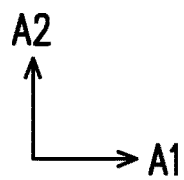

FIG. 2A is a schematic diagram of a capturing image 131a captured by the image capturing device 130 of the embodiment of FIG. 1A. Referring to FIG. 1A and FIG. 2A, the projection device 110 is configured to project the grid pattern 111 to the projection target 170. The projection target 170 includes the border region 171 and the projection region 173, where the border region 171 surrounds the projection region 173. The grid pattern 111 has deformation at the border region 171. The image capturing device 130 is configured to capture the capturing image 131a including the image 170a of the projection target 170, where a size of the capturing image 131a is greater than the image 170a. The image 170a includes a deformation region 172a. The processing device 150 receives the capturing image 131a including the image 170a of the projection target 170. The processing device 150 determines a position of the border region 171 according to the deformation region 172a of the image 170a. Moreover, the processing device 150 controls the projection device 110 to project a projection image to the projection region 173 of the projection target 170 according to the position of the border region 171, where the projection image projected by the projection device 110 is not projected to the border region 171.

Figure 4:
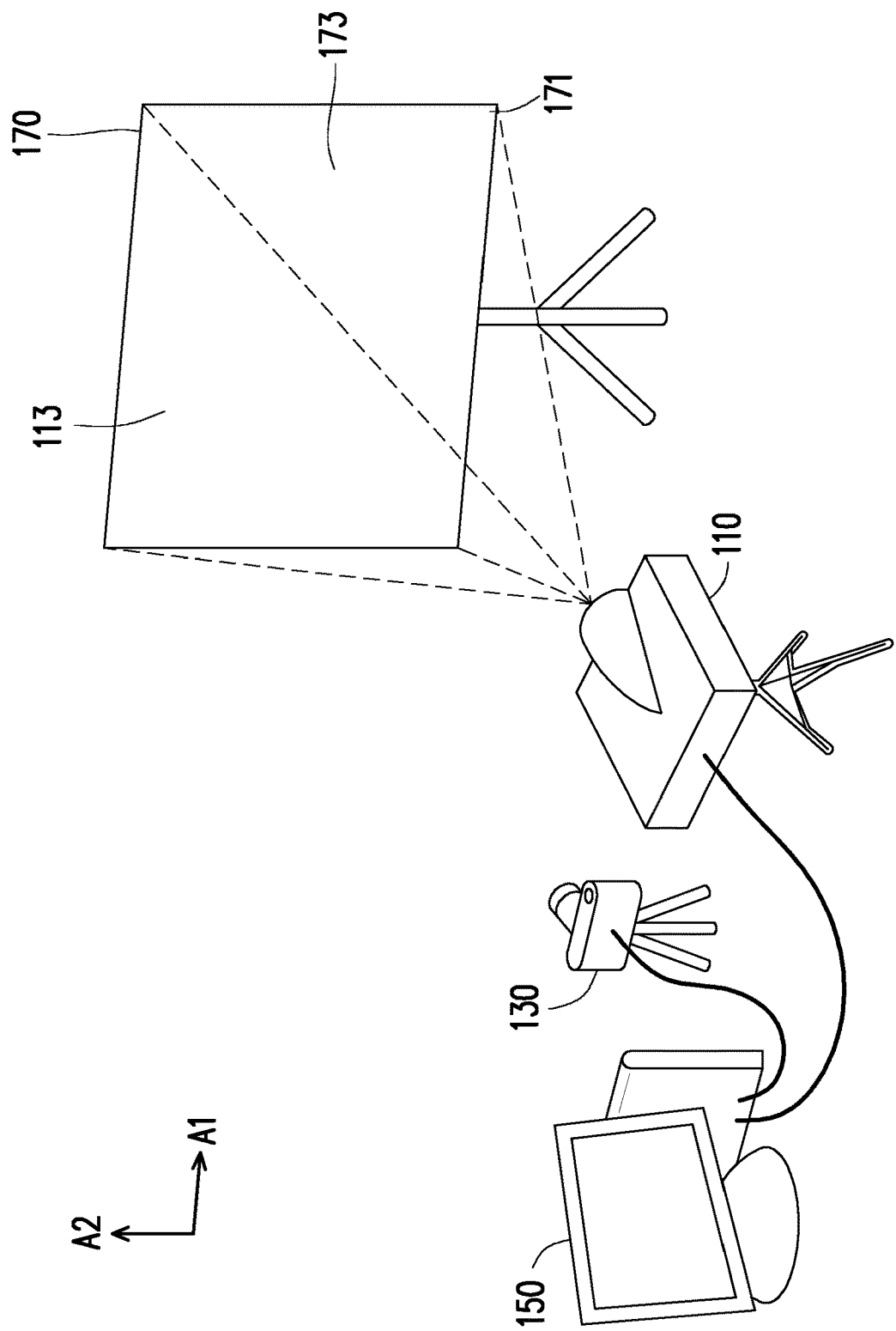
FIG. 4 is a schematic diagram of a projection system according to an embodiment of the invention.

FIG. 4 is a schematic diagram of a projection system according to an embodiment of the invention. Referring to FIG. 4, after the processing device 150 determines the position of the border region 171, the processing device 150 controls to project the projection image 113 to the projection region 173 of the projection target 170, where the projection image 113 refers to image information stored in the processing device 150. An operation detail is described below. To be specific, referring to FIG. 1A, the grid pattern 111 includes a plurality of first direction lines 1111 and a plurality of second direction lines 1113. The first direction lines 1111 extend in the first direction A1, and are arranged in the second direction A2. The second direction lines 1113 extend in the second direction A2, and are arranged in the first direction A1. The first direction lines 1111 are not parallel with the second direction lines 1113, and the first direction lines 1111 are perpendicular to the second direction lines 1113. The border region 171 includes a plurality of first borders 1711 extending in the first direction A1 and arranged in the second direction A2. The second direction lines 1113 have deformations at the first borders 1711. The processing device 150 may determine positions of the first borders 1711 according to the image corresponding to the deformations of the second direction lines 1113. The border region 171 includes a plurality of second borders 1713 extending in the second direction A2 and arranged in the first direction A1. The first direction lines 1111 have deformations at the second borders 1713. The processing device 150 may determine positions of the second borders 1713 according to the image corresponding to the deformations of the first direction lines 1111.

In detail, in the present embodiment, the projection target 170 has two first borders 1711 respectively located on the top and bottom and two second borders 1713 respectively located to the left and right. Referring to FIG. 2A, images corresponding to the grid pattern 111, the first borders 1711, the second borders 1713, the first direction lines 1111 and the second direction lines 1113 in the capturing image 131a are respectively grid pattern images 111a, first border images 1711a, second border images 1713a, first direction line images 1111a and second direction line images 1113a. The second direction lines 1113 projected by the projection device 110 have deformations at the first borders 1711, so that the second direction line images 1113a also have deformations at the first border images 1711a. The processing device 150 may determine a plurality of deformation points 1114a according to deformation positions of the second direction line images 1113a at the first border images 1711a in the capturing image 131a.

Figure 3A:
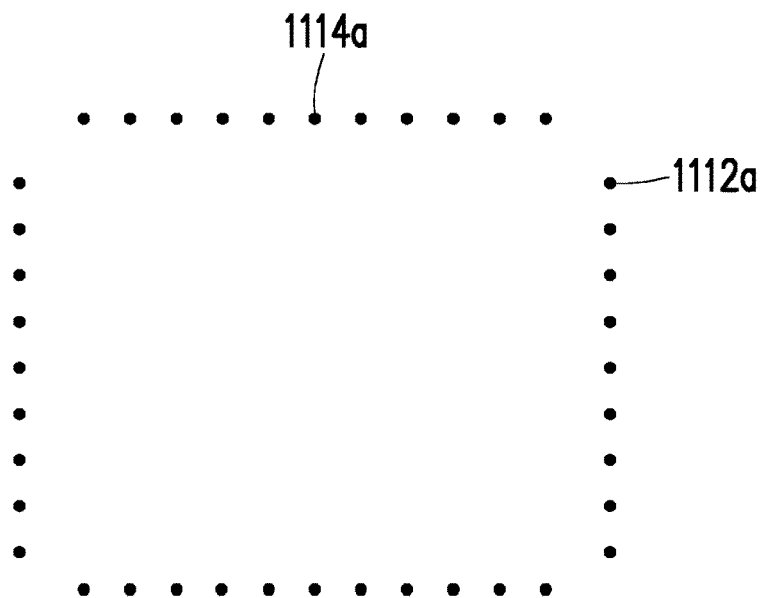
FIG. 3A is a schematic diagram of deformation points of the capturing image according to an embodiment of the invention.

FIG. 3A is a schematic diagram of deformation points of the capturing image 131a according to the present embodiment. As shown in FIG. 3A, after the processing device 150 obtains positions of the deformation points 1114a through image recognition, the processing device 150 may determine positions of the first border images 1711a according to the deformation points 1114a. The processing device 150 may determine a plurality of deformation points 1112a according to positions of deformations of the first direction line images 1111a at the second border images 1713a in the capturing image 131a. The processing device 150 determines positions of the second border images 1713a according to the deformation points 1112a. When the processing device 150 determines the positions of the first border images 1711a and the second border images 1713a, the processing device 150, for example, operates based on a linear equation between two points to calculate a straight line between two adjacent deformation points, so as to obtain the positions of the first border images 1711a and the second border images 1713a. The processing device 150 may accordingly control the projection device 110 to project image to the positions corresponding to the first border images 1711a and the second border images 1713a, so as to project the projection image 113 to the projection region 173 of the projection target 170.

It should be noted that the projection target 170 is within a projection range of the projection device 110, and the capturing image 131a captured by the image capturing device 130 includes the projection range of the projection device 110. Moreover, the deformation produced at the border region 171 of the projection target 170 by the grid pattern 111, for example, includes breakpoints with discontinuous lines and/or breakpoints with discontinuous colors. For example, in the embodiment of FIG. 1A, the projection target 170 is, for example, a projection screen disposed on a tripod, so that the grid pattern 111 may produce the breakpoints with discontinuous lines at the border region 171. If the projection target 170 is a projection screen disposed on a wall, the grid pattern 111 does not necessarily produce the breakpoints with discontinuous lines at the border region 171, but probably only produce breakpoints with discontinuous colors between the projection region 173 or the border region 171 and the wall.

The image capturing device 130 is, for example, a digital video camera or a digital camera having a photo-sensing device such as a charge-coupled device (CCD) or a complementary metal-oxide-semiconductor (CMOS) device, etc., and the image capturing device 130 may be an independent device, and is connected to the processing device 150 through a wired or wireless manner. The image capturing device 130 may also be disposed on the projection device 110, and the projection device 110 is connected to the processing device 150 through a wired or wireless manner, though the invention is not limited thereto. The processing device 150 is, for example, an electronic device such as a desktop computer, a notebook computer, a tablet computer or a smart phone, etc., and the processing device 150 may also be a processing circuit disposed in the projection device 110. The projection target 170 is, for example, a projection screen, a wall or a billboard, etc., which is not limited by the invention.

It should be noted that in the projection system 100, the projection device 110 may project a plurality of grid patterns with different relative positions to obtain more deformation points, so as to accurately calculate the positions of the first border images 1711a and the second border images 1713a.

Figure 1B:
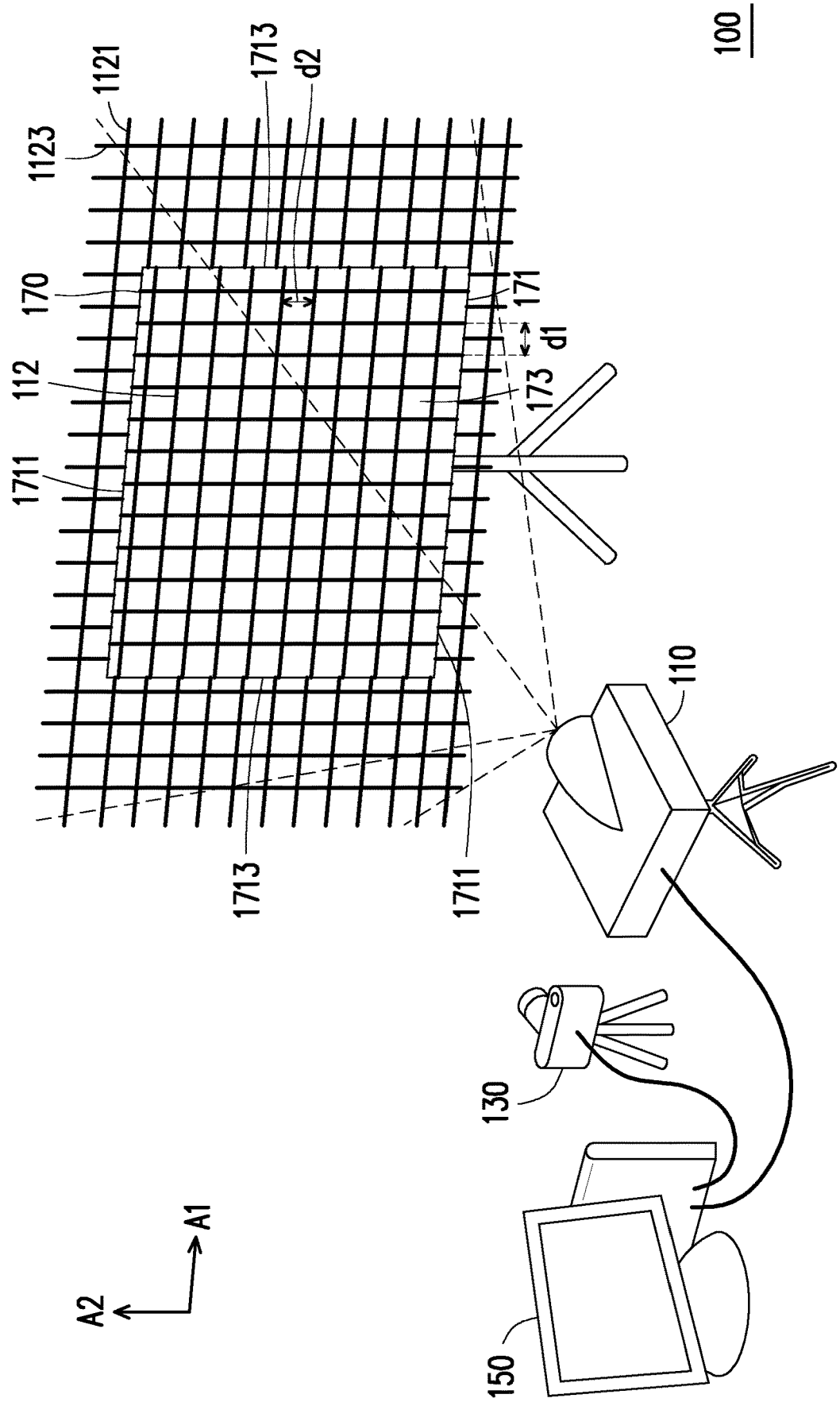
FIG. 1B is a schematic diagram of a projection system according to an embodiment of the invention.

FIG. 1B is a schematic diagram of a projection system according to an embodiment of the invention. Referring to FIG. 1A and FIG. 1B, the second direction lines 1113 of the grid pattern 111 are arranged at equal intervals in the first direction A1 by a first interval d1, and the first direction lines 1111 are arranged at equal intervals in the second direction A2 by a second interval d2. As shown in FIG. 1B, after the processing device 150 obtains the positions of the deformation points 1112a and 1114a, the processing device 150 may control the projection device 110 to project a grid pattern 112 to the projection target 170. Compared to the grid pattern 111, the grid pattern 112 has a displacement in the first direction A1 and a displacement in the second direction A2, and the displacement in the first direction A1 is smaller than the first interval d1, and the displacement in the second direction A2 is smaller than the second interval d2.

Figure 2B:
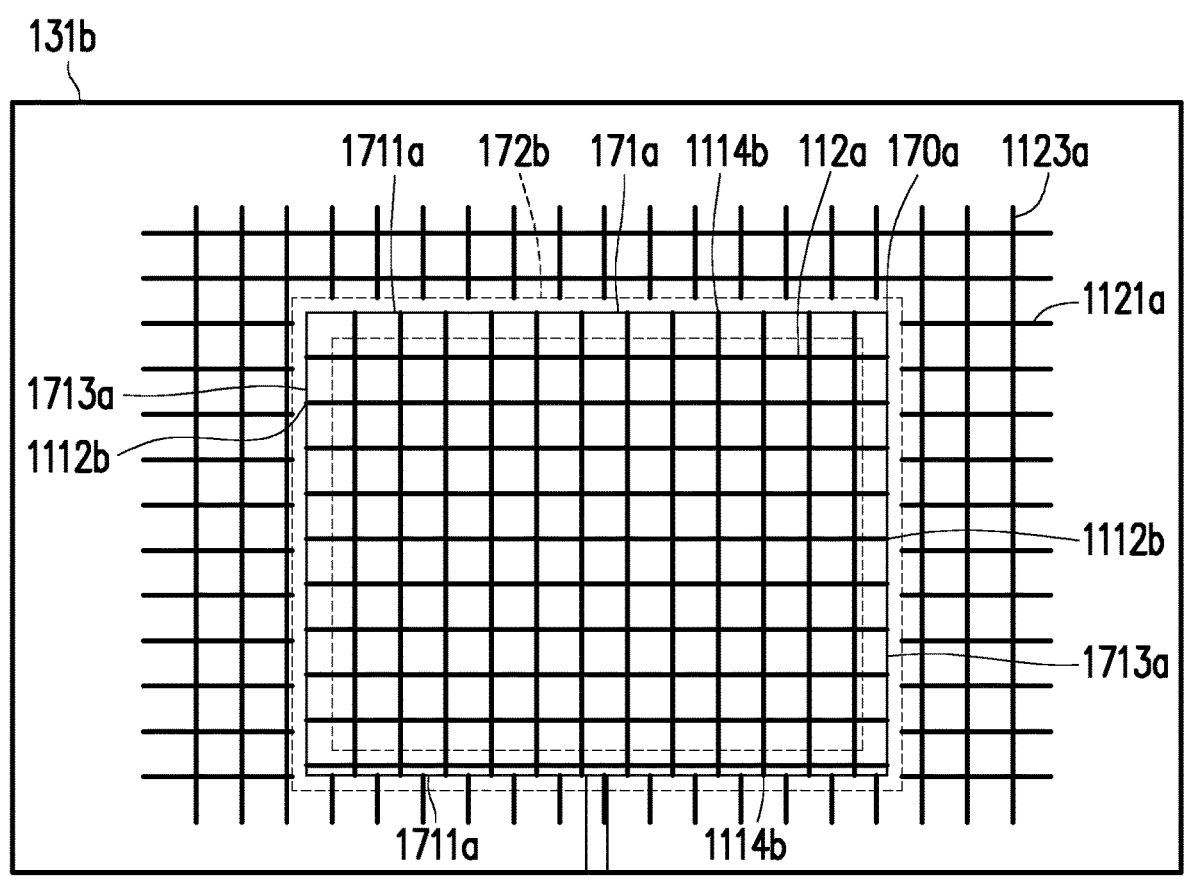
FIG. 2B is a schematic diagram of a capturing image captured by an image capturing device of FIG. 1B.
Figure 2B:
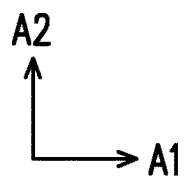

FIG. 2B is a schematic diagram of a capturing image 131b captured by the image capturing device 130 of FIG. 1B. Images corresponding to the grid pattern 112, the first direction lines 1121 and the second direction lines 1123 in the capturing image 131b are respectively grid pattern images 112a, first direction line images 1121a and second direction line images 1123a. The grid pattern 112 also has deformation at the border region 171 of the projection target 170, such that the capturing image 131b has a deformation region 172b. The processing device 150 may determine a plurality of deformation points 1114b according to deformation positions of the second direction line images 1123a at the first border images 1711a in the capturing image 131b. Moreover, the processing device 150 determine a plurality of deformation points 1112b according to deformation positions of the first direction line images 1121a at the second border images 1713a.

Figure 3B:
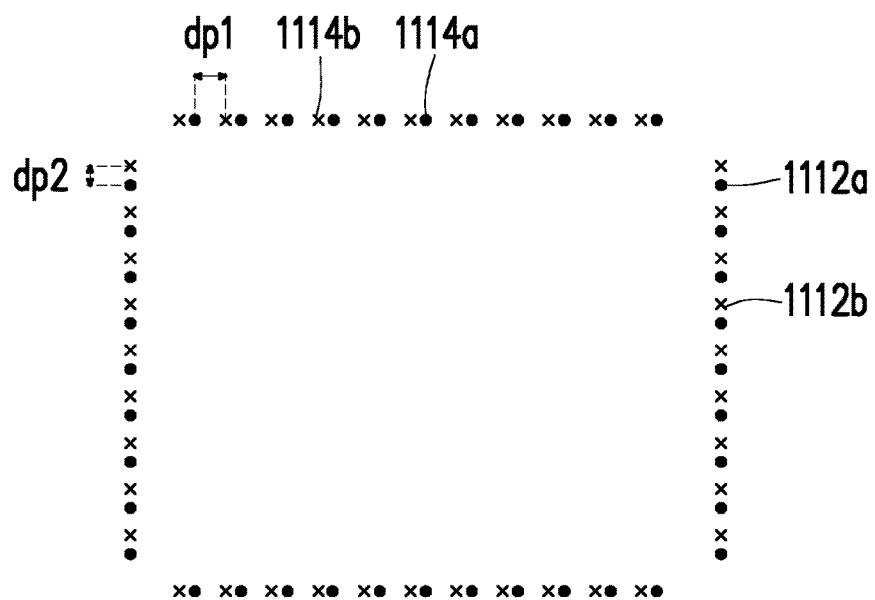
FIG. 3B is a schematic diagram of deformation points of the capturing image according to an embodiment of the invention.

As shown in FIG. 3B, after the processing device 150 obtains positions of the deformation points 1112b and the deformation points 1114b through image recognition, the processing device 150 may commonly operate the above positions and the positions of the deformation points 1112a and the deformation points 1114a obtained from the capturing image 131a. Compared to the grid pattern 111, since the grid pattern 112 has the displacement in the first direction A1 and the displacement in the second direction A2, the deformation points 1114a and the adjacent deformation points 1114b may have a corresponding displacement dp1, and the deformation points 1112a and the adjacent deformation points 1112b may have a corresponding displacement dp2. The processing device 150 may determine the positions of the first border images 1711a according to the deformation points 1114a and 1114b, and determine the positions of the second border images 1713a according to the deformation points 1112a and 1112b, and project the projection image 113 to the projection region 173 of the projection target 170.

Moreover, in the embodiment of FIG. 1A to FIG. 4, before the projection device 110 projects the projection image 113 to the projection region 173, the projection device 110 may first project a plurality of reference images to the projection target 170. The image capturing device 130 captures the reference images. The processing device 150 identifies a projection range of the projection device 110 according to the reference images captured by the image capturing device 130, so as to ensure that the projection target 170 is within the projection range of the projection device 110, and the capturing images 131a and 131b captured by the image capturing device 130 may include the projection range of the projection device 110.

Figure 5A:
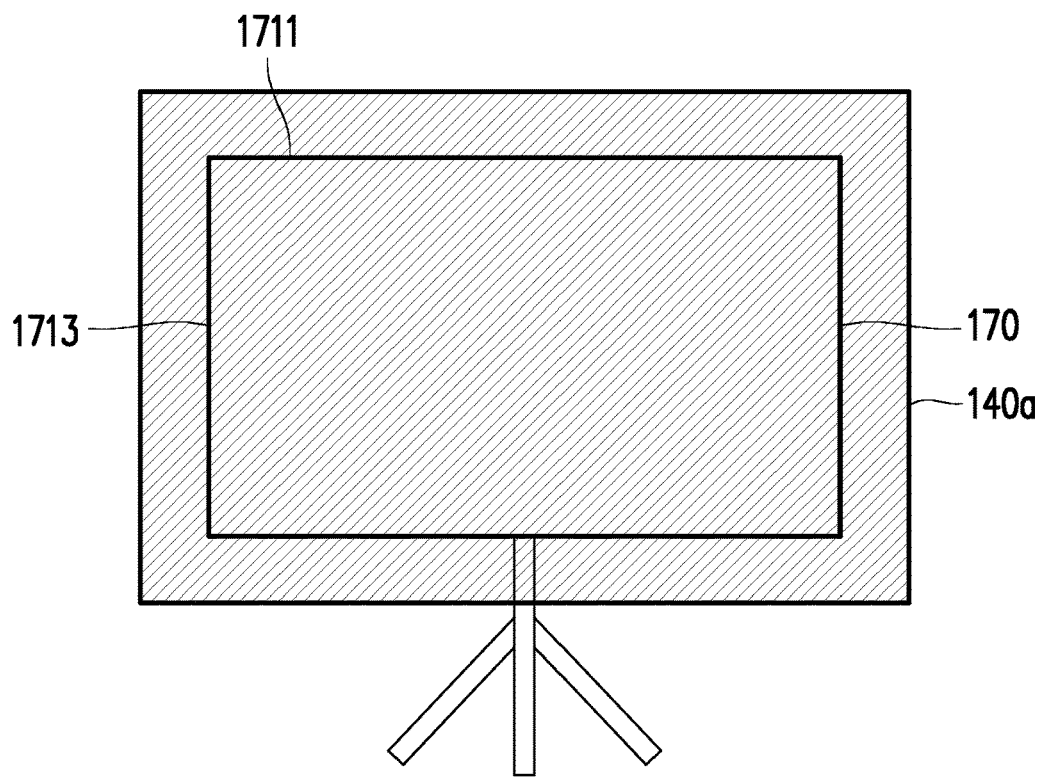
FIG. 5A is a schematic diagram of a reference image according to an embodiment of the invention.
Figure 5B:
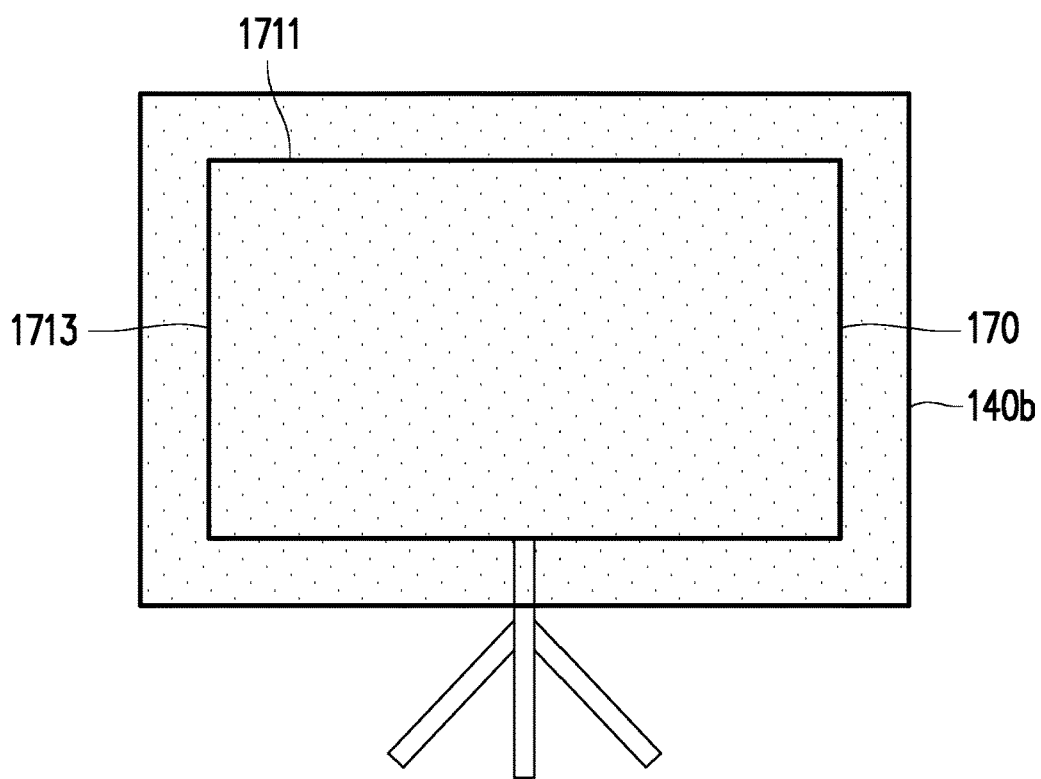
FIG. 5B is a schematic diagram of a reference image according to an embodiment of the invention.
Figure 5C:
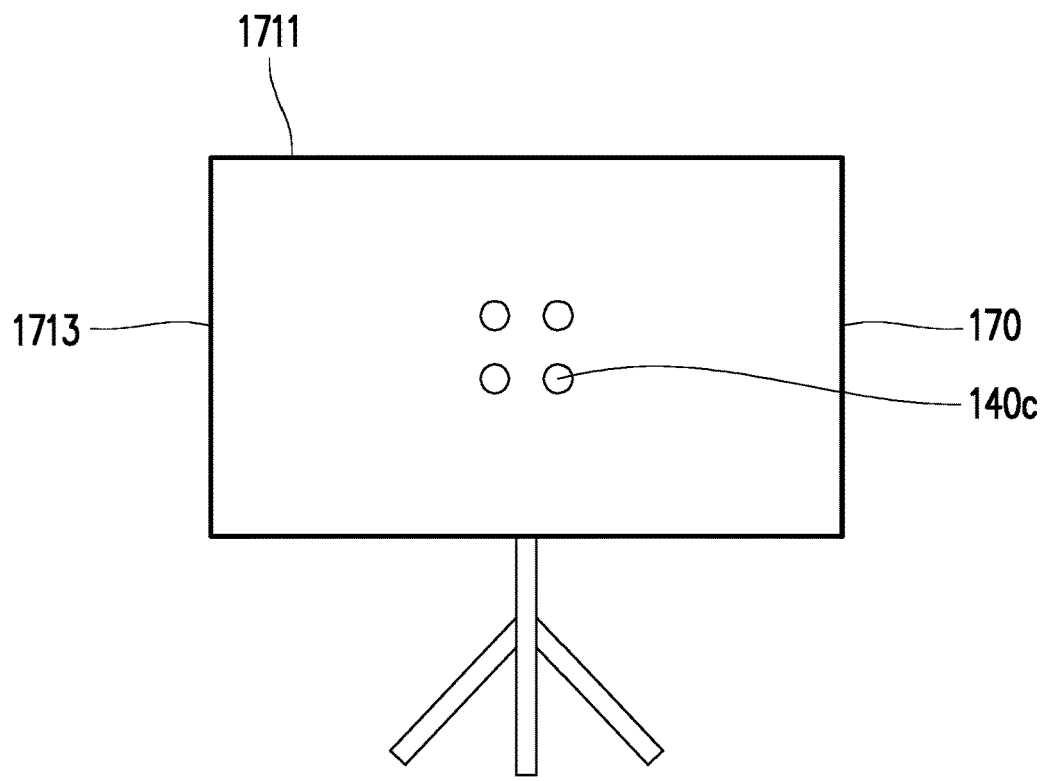
FIG. 5C is a schematic diagram of a reference image according to an embodiment of the invention.
Figure 5D:
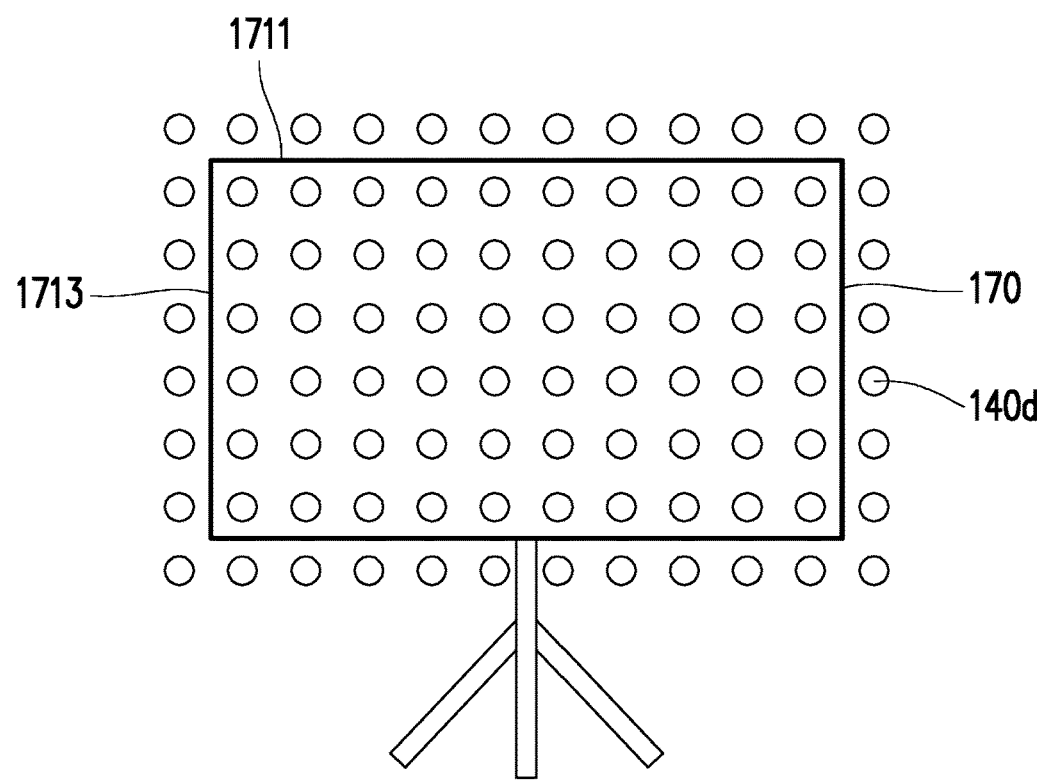
FIG. 5D is a schematic diagram of a reference image according to an embodiment of the invention.

FIG. 5A to FIG. 5D are schematic diagrams of the reference images according to an embodiment of the invention, which represent a processing flow of converting a coordinate system of the image capturing device into a coordinate system of the projection device. As shown in FIG. 5A, the reference image 140a projected to the projection target 170 by the projection device 110 is a full black image. As shown in FIG. 5B, the reference image 140b is a full white image. As shown in FIG. 5C, the reference image 140c is a first point array image. In the present embodiment, the first point array image is, for example, 4 round balls located in a middle region of the projection target 170. As shown in FIG. 5D, the reference image 140d is a second point array image. In the present embodiment, the second point array image is obtained according to the first point array image. In the present embodiment, the second point array image is a round ball array obtained by extending the 4 round balls of the reference image 140c towards an edge of the projection target 170, and the round ball array covers the projection range of the projection device 110 by using, for example, an interpolation or extrapolation method.

The processing device 150 may determine the projection range of the projection device 110 according to the reference images 140a, 140b, 140c, 140d captured by the image capturing device 130. In other words, the processing device 150 may obtain a conversion relationship between the coordinate system of the image capturing device 130 and the coordinate system of the projection device 110, and store the same in the storage device of the processing device 150.

Figure 6:
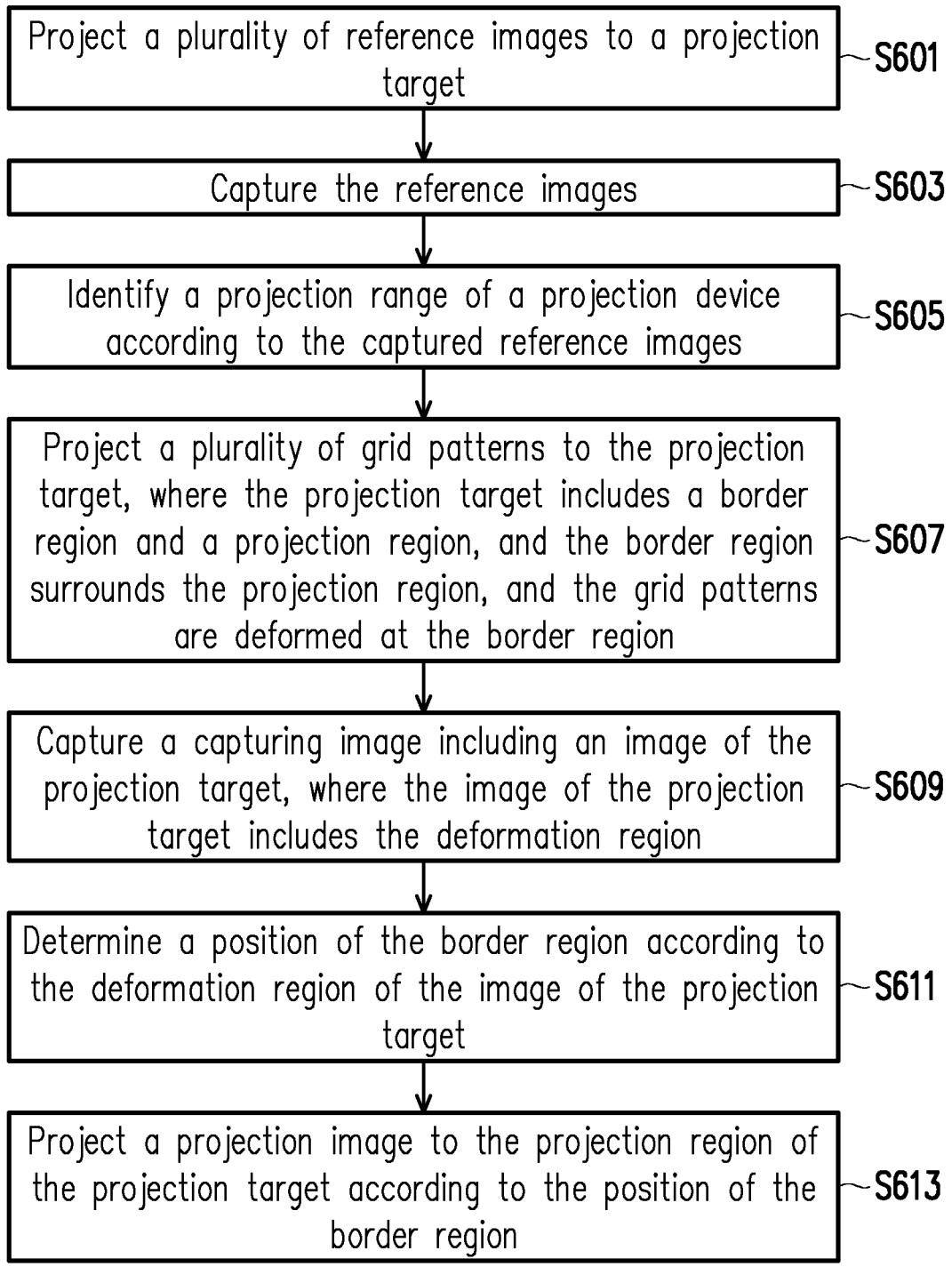
FIG. 6 is a flowchart illustrating an image projection method according to an embodiment of the invention.

FIG. 6 is a flowchart illustrating an image projection method according to an embodiment of the invention. Referring to FIG. 6, in step S601, a plurality of reference images is projected to a projection target. Then, in step S603, the image capturing device 130 is applied to capture the reference images. In step S605, a projection range of a projection device is identified according to the captured reference images, and the processing device 150 obtains a conversion relationship between a coordinate system of the image capturing device 130 and a coordinate system of the projection device 110. Then, in step S607, a plurality of grid patterns is projected to the projection target, where the projection target includes the border region and the projection region, and the border region surrounds the projection region. The grid patterns are deformed at the border region, which is achieved by using the conversion relationship between the coordinate system of the image capturing device and the coordinate system of the projection device. In step S609, a capturing image including an image of the projection target is captured, where the image of the projection target includes the deformation region. Then, in step S611, a position of the border region is determined according to the deformation region of the image of the projection target, and in step S613, a projection image is projected to the projection region of the projection target according to the position of the border region.

Moreover, enough instructions and recommendations for the image projection method of the invention may be learned from the descriptions of the embodiments of FIG. 1 to FIG. 4, and detailed description thereof is not repeated.

In summary, in the projection system and the image projection method of the invention, a plurality of grid patterns is projected to the projection target through the projection device. The image capturing device captures the capturing image including the image of the projection target, and the image of the projection target includes a deformation region where the grid patterns are deformed at the border region. The processing device determines the position of the border region according to the deformation region, and controls the projection device to project the projection image to the projection region of the projection target according to the position of the border region, such that the projection image is quickly and automatically adjusted to the projection region.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:
   a projection device, configured to project a plurality of grid patterns to a projection target, wherein the projection target comprises a border region and a projection region, and the border region surrounds the projection region, and the grid patterns are deformed at the border region;
   an image capturing device, configured to capture a capturing image comprising an image of the projection target, wherein the image of the projection target comprises a deformation region; and a processing device, configured to receive the capturing image comprising the image of the projection target, and determine a position of the border region according to the deformation region of the image of the projection target, and control the projection device to project a projection image to the projection region of the projection target according to the position of the border region, and wherein the projection device projects a plurality of reference images to the projection target, the image capturing device captures the reference images, the processing device identifies a projection range of the projection device according to the reference images captured by the image capturing device, and the processing device obtains a conversion relationship between a coordinate system of the image capturing device and a coordinate system of the projection device, and wherein the reference images comprise a full black image, a full white image, a first point array image and a second point array image, wherein the second point array image is obtained according to the first point array image.

2. The projection system of claim 1, wherein each of the grid patterns comprises a plurality of first direction lines and a plurality of second direction lines, the first direction lines extend in a first direction and are arranged in a second direction, the second direction lines extend in the second direction and are arranged in the first direction, and the first direction lines are not parallel with the second direction lines.

3. The projection system of claim 2, wherein the border region comprises a plurality of first borders extending in the first direction and arranged in the second direction, the second direction lines have deformations at the first borders, and the processing device determines positions of the first borders according to images corresponding to the deformations of the second direction lines.

4. The projection system of claim 3, wherein the border region comprises a plurality of second borders extending in the second direction and arranged in the first direction, the first direction lines have deformations at the second borders, and the processing device determines positions of the second borders according to images corresponding to the deformations of the first direction lines.

5. The projection system of claim 2, wherein the second direction lines are arranged at equal intervals in the first direction by a first interval, and the first direction lines are arranged at equal intervals in the second direction by a second interval, the grid patterns comprise a first grid pattern and a second grid pattern, and the second grid pattern has a first direction displacement and a second direction displacement compared to the first grid pattern, wherein the first direction displacement is smaller than the first interval, and the second direction displacement is smaller than the second interval.

6. The projection system of claim 1, wherein the projection device projects a first point array image to the projection target, the image capturing device captures the first point array image, and the processing device identifies the projection region of the projection target according to the first point array image captured by the image capturing device.

7. The projection system of claim 1, wherein the projection target is within a projection range of the projection device.

8. The projection system of claim 7, wherein the capturing image captured by the image capturing device comprises the projection range of the projection device.

9. An image projection method, comprising:
projecting a plurality of reference images to a projection target;
capturing the reference images;
identifying a projection range of a projection device according to the captured reference images, and obtaining a conversion relationship between a coordinate system of an image capturing device and a coordinate system of the projection device, wherein the reference images comprise a full black image, a full white image, a first point array image and a second point array image and the second point array image is obtained according to the first point array image;
projecting a plurality of grid patterns to the projection target, wherein the projection target comprises a border region and a projection region, and the border region surrounds the projection region, the grid patterns are deformed at the border region;
capturing a capturing image comprising an image of the projection target, wherein the image of the projection target comprises a deformation region; and
determining a position of the border region according to the deformation region of the image of the projection target, and projecting a projection image to the projection region of the projection target according to the position of the border region.

10. The image projection method of claim 9, wherein each of the grid patterns comprises a plurality of first direction lines and a plurality of second direction lines, the first direction lines extend in a first direction and are arranged in a second direction, the second direction lines extend in the second direction and are arranged in the first direction, and the first direction lines are not parallel with the second direction lines.

11. The image projection method of claim 10, wherein the border region comprises a plurality of first borders extending in the first direction and arranged in the second direction, the second direction lines have deformations at the first borders, wherein the step of determining the position of the border region according to the deformation region comprises determining positions of the first borders according to images corresponding to the deformations of the second direction lines.

12. The image projection method of claim 11, wherein the border region comprises a plurality of second borders extending in the second direction and arranged in the first direction, the first direction lines have deformations at the second borders, and the step of determining the position of the border region according to the deformation region comprises determining positions of the second borders according to images corresponding to the deformations of the first direction lines.

13. The image projection method of claim 10, wherein the second direction lines are arranged at equal intervals in the first direction by a first interval, and the first direction lines are arranged at equal intervals in the second direction by a second interval, the grid patterns comprise a first grid pattern and a second grid pattern, and the second grid pattern has a first direction displacement and a second direction displacement compared to the first grid pattern, wherein the first direction displacement is smaller than the first interval, and the second direction displacement is smaller than the second interval.

14. The image projection method of claim 9, further comprising:
 projecting a first point array image to the projection target;
 capturing the first point array image; and
 identifying the projection region of the projection target according to the captured first point array image.

15. The image projection method of claim 9, wherein the projection target is within a projection range of a projection device.

16. The image projection method of claim 15, wherein the capturing image comprises the projection range of the projection device.

* * * * *